US012705835B2

(12) United States Patent
Gopinadhan et al.

(10) Patent No.: US 12,705,835 B2
(45) Date of Patent: Aug. 11, 2026

(54) STREAMLINED SINGLE SOFTWARE WORKFLOW WITH ML-BASED POINT CLOUD CLUSTERING FOR VIRTUAL REALITY BUILDING INSPECTION

(71) Applicant: University of Florida Research Foundation, Inc., Gainesville, FL (US)

(72) Inventors: Jithin Gopinadhan, Gainesville, FL (US); Ravi Shankar Srinivasan, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 142 days.

(21) Appl. No.: 18/543,650

(22) Filed: Dec. 18, 2023

(65) Prior Publication Data

US 2024/0203054 A1 Jun. 20, 2024

Related U.S. Application Data

(60) Provisional application No. 63/476,321, filed on Dec. 20, 2022.

(51) Int. Cl.

| | |
|---|---|
| ***G06T 17/20*** | (2006.01) |
| ***G06T 7/60*** | (2017.01) |
| ***G06V 10/74*** | (2022.01) |
| ***G06V 10/762*** | (2022.01) |

(52) U.S. Cl.
CPC ................ *G06T 17/20* (2013.01); *G06T 7/60* (2013.01); *G06V 10/761* (2022.01); *G06V 10/762* (2022.01)

(58) Field of Classification Search
CPC ........ G06T 17/20; G06T 7/60; G06F 2111/18; G06F 30/13
See application file for complete search history.

(56) References Cited

U.S. PATENT DOCUMENTS

| | | | |
|---|---|---|---|
| 11,928,873 B2 * | 3/2024 | Phalak | G06V 10/7625 |
| 2018/0012125 A1 * | 1/2018 | Ladha | G06N 3/044 |
| 2021/0183080 A1 * | 6/2021 | Hoiem | G06T 19/20 |

* cited by examiner

*Primary Examiner* — Grace Q Li
(74) *Attorney, Agent, or Firm* — Thomas Horstemeyer LLP

(57) ABSTRACT

The present disclosure presents system and methods for virtual building construction inspection. One such method, among others, comprises storing, by a computing device, an as-planned building information model (BIM) data for a building project, wherein the as-planned BIM data comprises a 3D design model of the building project; acquiring, by the computing device, an as-built point cloud data of the building project; processing, by the computing device, the as-built point cloud data to generate cluster points; generating, by the computing device, 3D geometry and mesh data for each cluster point set; and performing, by the computing device, virtual reality visualization of the 3D geometries generated from the as-built point cloud data and correlating the 3D geometries with the as-planned BIM data.

15 Claims, 3 Drawing Sheets

STREAMLINED SINGLE SOFTWARE WORKFLOW WITH ML-BASED POINT CLOUD CLUSTERING FOR VIRTUAL REALITY BUILDING INSPECTION

CROSS-REFERENCE TO RELATED APPLICATION

This application claims priority to U.S. provisional application entitled, "Streamlined Single Software Workflow with ML-Based Point Cloud Clustering for Virtual Reality Building Inspection," having application No. 63/476,321, filed Dec. 20, 2022, which is entirely incorporated herein by reference.

BACKGROUND

Many author have reported the benefits of Building Information Models (BIM) in the AEC (Architecture, Engineering & Construction) industry and have indicated that BIM has improved collaboration, cost-savings, project time schedules, has enhanced communications and data exchanges between different domains, and also has aided in the whole life cycle of a building.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
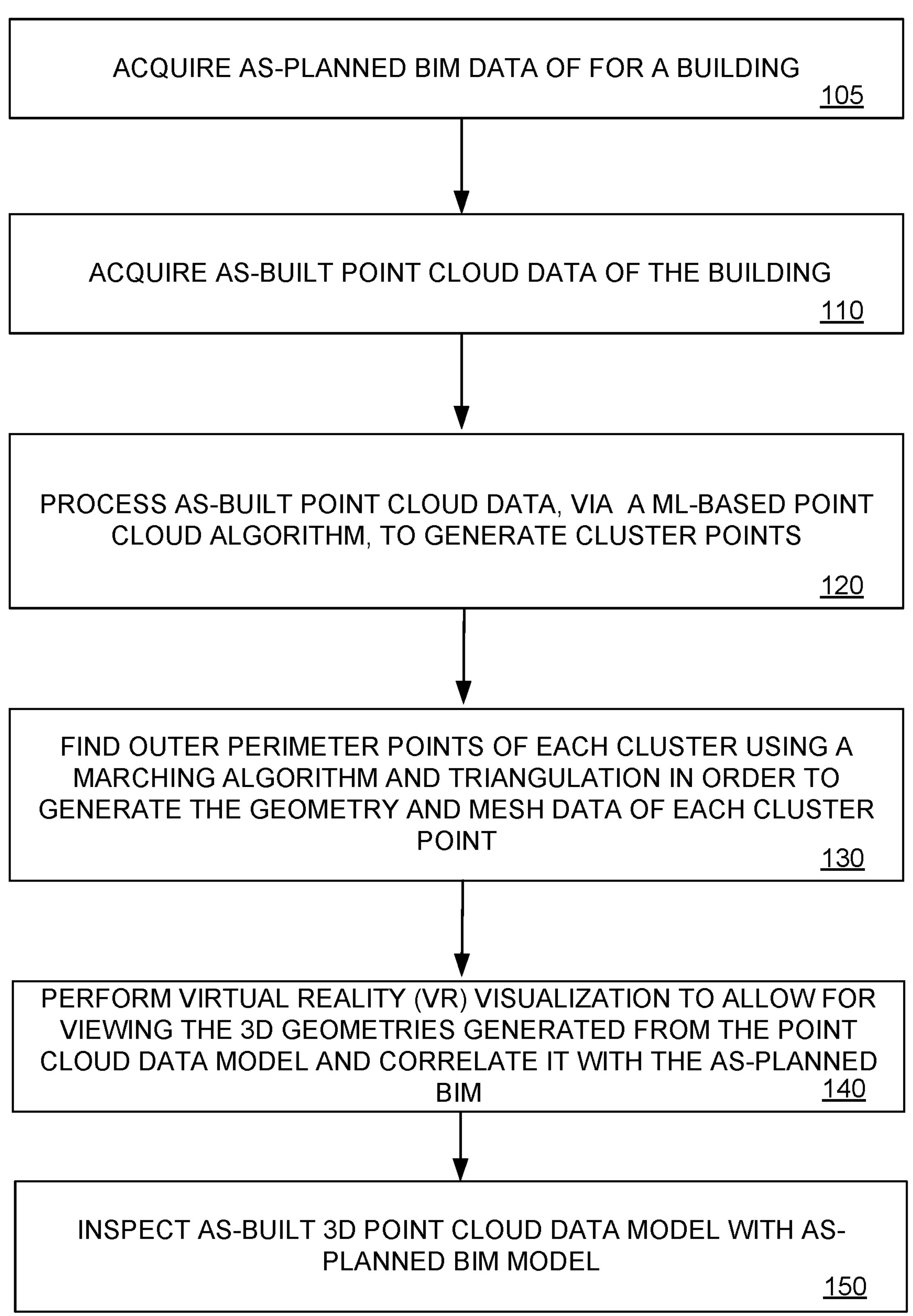
FIG. 1 is a flowchart diagram of an exemplary building construction inspection visualization method in accordance with embodiments of the present disclosure.

The present disclosure relates to virtual building construction inspection. As such, there are currently no single software workflows available for virtual based inspection on as-built building information modeling (BIM). To view BIM data with point cloud data, users are required to export all the data into a BIM software tool (e.g., Autodesk Revit) which adds complexity and requires additional cost.

Building Information Modelling (BIM) has become a powerful tool to manage construction data and models in one place and has enabled the improvement of construction performance for many organizations. In most projects, BIM is used during the planning and design phase to reflect what the intentions of the building designers are. This is typically called as-planned BIM. But as construction progresses, there are alterations, additions and design changes made to the building for various reasons. As the real-life building deviates more from the as-planned BIM, it becomes essential to integrate this information back into the BIM platform to maintain as-built BIM data. The as-built BIM updated through the different stages of construction provides the as-built documentation of all the systems within the building. This information makes it possible for better quality control and problem solving during the construction and enhanced building system management through the rest of its life cycle.

An exemplary virtual building construction inspection process may include several components and phases. Point cloud and image captures can be obtained by the inspector or specialist on the premises with a portable tablet or similar portable devices equipped with LiDAR (Light Detection and Ranging), digital photogrammetery/videogrammetry, Thermal InfraRed (TIR), or a digital laser scanner for visual inspection and compliance check with a progress of the building in comparison to the approved building permit requirements.

Point cloud data refers to any data set that is represented in a 3D coordinate system. In most cases, this is represented in the Cartesian Coordinate system (X, Y, Z). Point cloud data is one of the popular means to document as-built data for constructions sites. The data collection can be performed using several different technologies. As mentioned, two common methods used in the construction industry are LiDAR scans and Photogrammetry/Videogrammetry.

LiDAR scanning hardware (scanners) can be used in the field to directly scan point data. LiDAR scanners can measure the distance to the target points based on the time taken for the reflected laser beam to return to the scanner. LiDAR scanning hardware with different levels of capabilities are available in the market and are selected depending on the needs of the user. The construction industry typically uses stationary scan stations or LiDAR systems built into handheld mobile devices as LiDAR systems are commonly used in the construction industry for documenting sites, existing buildings, and progress at construction sites. The data collected is then transferred to a computing system for further processing. The processing can be carried out on dedicated software provided by the hardware makers or external point cloud processing software.

Photogrammetry/Videogrammetry uses photographic images or videos to recreate a 3D point data set. This method uses algorithms that identify key points in a photo or a video frame and keeps track of the 2D pixel position of the key points in the subsequent photos or frames to estimate the position of the points in a 3D space. Mobile handheld devices or other computing systems/devices can be used to document the site and the photos or video frames can be processed to generate the point cloud data.

Point cloud systems provide a relatively quick method for documenting and reconstructing an as-built condition with high accuracy. This high-quality data can be used for quality inspection, progress monitoring, collaboration, and design coordination. In most cases, the point cloud data is used to make visual observations and acquire measurements. The data collected is typically the X, Y, Z coordinate points, point normal, and color data. However, this raw data does not provide any additional information regarding the type of material or what building part it corresponds to. With the advances in computational capabilities and access to cloud infrastructure, it is now possible to use machine learning (ML) based algorithms on large point cloud data sets to extract more details off point cloud data sets. These algorithms can be used to extract geometry data of individual building components that can then be integrated into BIM.

In one embodiment, a structural steel rebar data capture from the point cloud and image captures (e.g., LiDAR, digital photography, Thermal InfraRed (TIR) images can be used to inspect engineering and structural features of the project, in a non-intrusive manner, and can be compared against permit designs. The resulting point cloud data captures can also be used for compliance checking of the project with engineering and architectural specifications, such as truss design, beams and columns sizes, slab, foundation, walls, windows, roof, and other building structures' strength, etc. that is a non-intrusive. Similarly, integrated TIR and LiDAR-based point cloud data can also be generated for electrical systems (wiring), plumbing (water & wastewater), and supply/return air duct systems to compare with Mechanical, Electrical, & Plumbing (MEP) specifications and drawings. Likewise, integrated TIR and LiDAR-based point cloud data can also be captured for windows, doors' location, staircase (rise, tread, width, numbers), balustrades for comparison with design specs, room measurements, wall and ceiling heights per architectural drawings, roof decking thickness and other properties, fastener spacing data capture, etc. And, the integrated TIR and LiDAR-based point cloud data capture can be utilized to determine the variances between the actual construction and approved design via overlaying (superimposing) the data point model on the permitted BIM design model.

In various embodiments, an acquired point cloud data model can be superimposed on a BIM model of building design and visualized in 2D or 3D by permit officials via a computing device 200 (FIG. 2), including portable tablets, to check for compliance with applicable building rules and codes. In this way, permit officials/developer(s)/project manager(s) can perform onsite visual inspections and/or remote visual inspections using a tablet device. For example, a developer can perform a comparison of bill of materials, wastage quantities, etc. Additionally, systems and methods of the present disclosure can be used as support in training of AEC (Architecture, Engineering & Construction) professionals. Virtual inspections using the disclosed methods/systems can also identify potential safety or hazard concerns/issues (Occupational Safety and Health Administration (OSHA) compliance) via the integrated TIR and LiDAR-based point cloud data captures.

In an exemplary embodiment, the captured or generated point cloud data model can be input into a BIM model (e.g., Autodesk Revit file) that can be used to compare the actual construction to the original approved permit drawings (e.g., a BIM model file format, such as an Autodesk Revit file) and allow for faster and more thorough inspection. In various embodiments, a distributed ledger technology (DLT) platform or network is used to store the BIM model data and associated algorithms on a secured distributed and encrypted platform.

In various embodiments, systems and methods of the present disclosure are configured to input point data acquired from LiDAR scanning of a room, building, etc., where the data that has been processed by LiDAR technology into a more refined point cloud file that is stored in computer database 214 (FIG. 2) (e.g., loaded up to the cloud) for processing under a series of programs/algorithms, executed by computing device 200, that will convert and reconstruct the data into an as-built BIM. The as-build BIM may then be compared with as-planned BIM to generate an inspection report using systems and methods of the present disclosure. In various embodiments, the point data can be rendered in either 2D or 3D by computing device 200. While a 2D rendering may show if a window or door is out of place after comparing the as-built and as-planned data, a 3D rendering may show if a wall is at 85 degrees in the as-built data versus at 90 degrees in the as-planned data. Accordingly, in various embodiments, an exemplary inspection report can provide a listing of these types of discrepancies.

There are a few commercial software packages which specialize in managing point cloud data and generating building element geometries. These software packages typically cluster the pre-processed point cloud and generate building geometry. The building geometry data may then be imported into a Revit model of a separate software package using a custom plugin. However, virtual reality (VR) visualization of such models again requires another commercial software package in order to perform the VR rendering which causes the process to be cumbersome and expensive. Thus, a streamlined workflow (i.e., the use of a single software-based workflow from raw point cloud data sets to the final step of VR visualization) is non-existent. Such a streamlined workflow will aid in the uptake of point cloud technology for virtual inspections, progress monitoring, and quality control and is addressed by systems and methods of the present disclosure.

To develop a streamlined single software workflow with machine learning (ML)-based point cloud clustering for VR building inspection, systems and methods of the present disclosure utilize a single computing platform that executes an ML-based point cloud clustering algorithm to process acquired point cloud data of a building (or other construction project) and identify building planes and cluster them to create building surfaces. In various embodiments, a modified marching algorithm finds the outer boundary of the building surface, identify openings, and create 3D geometries corresponding to the building surfaces. The computing platform additionally provides an interactive interface for the users to view and correlate the as-planned BIM model against the as-built 3D data model generated from point cloud data.

Referring now to FIG. 1, an exemplary embodiment of a building construction inspection visualization method of the present disclosure is provided. In step 105, as-planned BIM data is acquired by a computing platform or device 200. For example, the as-planned BIM data may be imported from an Autodesk Revit file in certain embodiments. In step 110, as-built point cloud data is acquired by a computing platform 200. For example, sensing raw data may be collected by an imaging device, scanner, or camera and transferred to a software that can perform initial processing to generate the raw point cloud data. In the case of LiDAR systems, this could be the proprietary software that comes with the imaging hardware. In the case of photogrammetry and videogrammetry, there are several software packages available to convert photos or video frames to point cloud data. This data can then be pre-processed using point cloud editing software like Autodesk Recap Pro, Meshlab, etc. to form a 3D model. In this step, the model can be viewed to remove outliers, noise etc. manually or based on specific parameters. In various embodiments, points that are not relevant to the building or construction project of concern can be removed, such as neighboring buildings, landscape, vegetation, etc. The as-build point cloud model data is then processed, via an ML-based point cloud algorithm of the computing platform 200, to cluster points and generate geometry of the as-built BIM model corresponding to the different building components, in step 120.

While there are several ML-based algorithms used for point cloud clustering that serve a wide array of applications, since the present disclosure is primarily aimed at the building sector, the ML-based algorithms are optimized to take advantage of the characteristics of the point cloud data. For example, most building components like floors, roof, ceilings, walls etc. tend to be flat surfaces. In addition to this, we also know that floors and ceilings are typically horizontal, while most walls are vertical. Therefore, an exemplary ML-based algorithm deployed by systems and methods of the present disclosure can implement a modified Random Sample Consensus (RANSAC) that will segment all the points on plane surfaces into a set of inlier point sets. Accordingly, in various embodiments, step 120 can be performed using a modified RANSAC algorithm that identifies building surfaces based on rules. In certain embodiments, the RANSAC algorithm can be configured to integrate a sequence of rules that will correspond to building characteristics. An exemplary RANSAC system uses deep neural network-style machine learning/artificial intelligence.

In general, RANSAC is an iterative method that will separate an input set into inliers and outliers based on some prespecified mathematical rules. In this case, the RANSAC creates planes based on randomly selected points in the data set and assigns a score to each plane depending on how many points from the input data set satisfying certain rules are contained within a specific distance threshold from the plane. Once a set of planes are generated, the best plane is selected, and the points are grouped together to create an inlier set for the plane. This process continues until all the plane data sets are generated. However, the points identified on a plane may not always be a part of the same geometry. For example, the ceilings in different rooms in a building may be in the same plane but need to be separated into different geometries. To separate such building elements into different geometries, an exemplary ML-based algorithm can perform a Density-based spatial clustering of applications with noise (DBSCAN) on each plane data set to create a set of cluster points. Accordingly, in various embodiments, step 120 can be performed using a DBSCAN algorithm that performs clustering of building components. Further, in various embodiments, DBSCAN can generate a cluster point corresponding to each building element from RANSAC output.

In general, DBSCAN creates clusters of points from the plane data sets based on point density and step distance parameters. Once the clusters are generated, the points are projected on to their corresponding planes and the outer perimeter points of each cluster are found using a marching algorithm and triangulation, in step 130 of FIG. 1, where the perimeter points are then joined together to generate the geometry and mesh data of each recognized cluster. An exemplary DBSCAN system uses deep neural network-style machine learning/artificial intelligence. For the perimeter points, the marching algorithm can be configured to identify openings like windows and doors. Any remaining points in the original data set are usually outliers or curved surfaces. These are then clustered separately and converted to 3D geometries. In various embodiments, a geometry library that contains mathematical functions and operations necessary for point cloud calculations is part of the computing platform. The generated building element data can then be saved in a computer database 214 for the user to access as needed during rendering or visualization of the as-built 3D data model.

Accordingly, in various embodiments, virtual reality (VR) visualization can be performed by the computing platform and allow for viewing the 3D geometries generated from the point cloud and correlate it with the as-planned BIM, in step 140, using custom render pipelines. In various embodiments, a virtual reality modeling engine (e.g., Unity 3D virtual reality engine) can be deployed to carry out the VR visualization using a VR headset (e.g., HTC Vive Pro 2). However, in various embodiments, a 2D visualization can also be performed on a client desktop or other client device having a 2D monitor display. As a result, in step 150, permitting inspection and related activities can be performed using the applicable visualization displays (e.g., VR headset for a 3D display and a computer monitor for a 2D display) and comparisons of the as-built and as-planned building models, such as overlaying as-planned BIM model data on as-built 3D model data for inspection.

As discussed, building permit review is the process of evaluating a proposed building design against its building codes and regulations to verify the quality and performance of the design and identify issues before construction takes place. Typically, counties and/or cities of the United States have one or more departments established to oversee building construction, where one can submit building documents, such as an application for a building permit.

To start an exemplary building review process, an Applicant can upload a building permit application to a computing platform 200, and the application can be prescreened to verify that the application is in the correct format, contact information is provided for the Applicant, or to verify other information that does not require detailed analysis or expert analysis of the contents of the application file. After the prescreening review is approved and completed, then the building permit application file can be analyzed in subsequent stages or phases of the review process. As part of this analysis, a previously stored version of the building permit application file may be retrieved and compared against an updated version of the building application file, such as that containing a point cloud data model of an actual and constructed design of the respective building. Upon completion of the review and analysis, the Applicant may be notified by the computing platform 200 that corrections are required and additional information will need to be reviewed or if the inspection or review has been approved. In various embodiments, an inspection report can be generated and rendered by the computing platform 200 with a listing of the required corrections.

Figure 2:
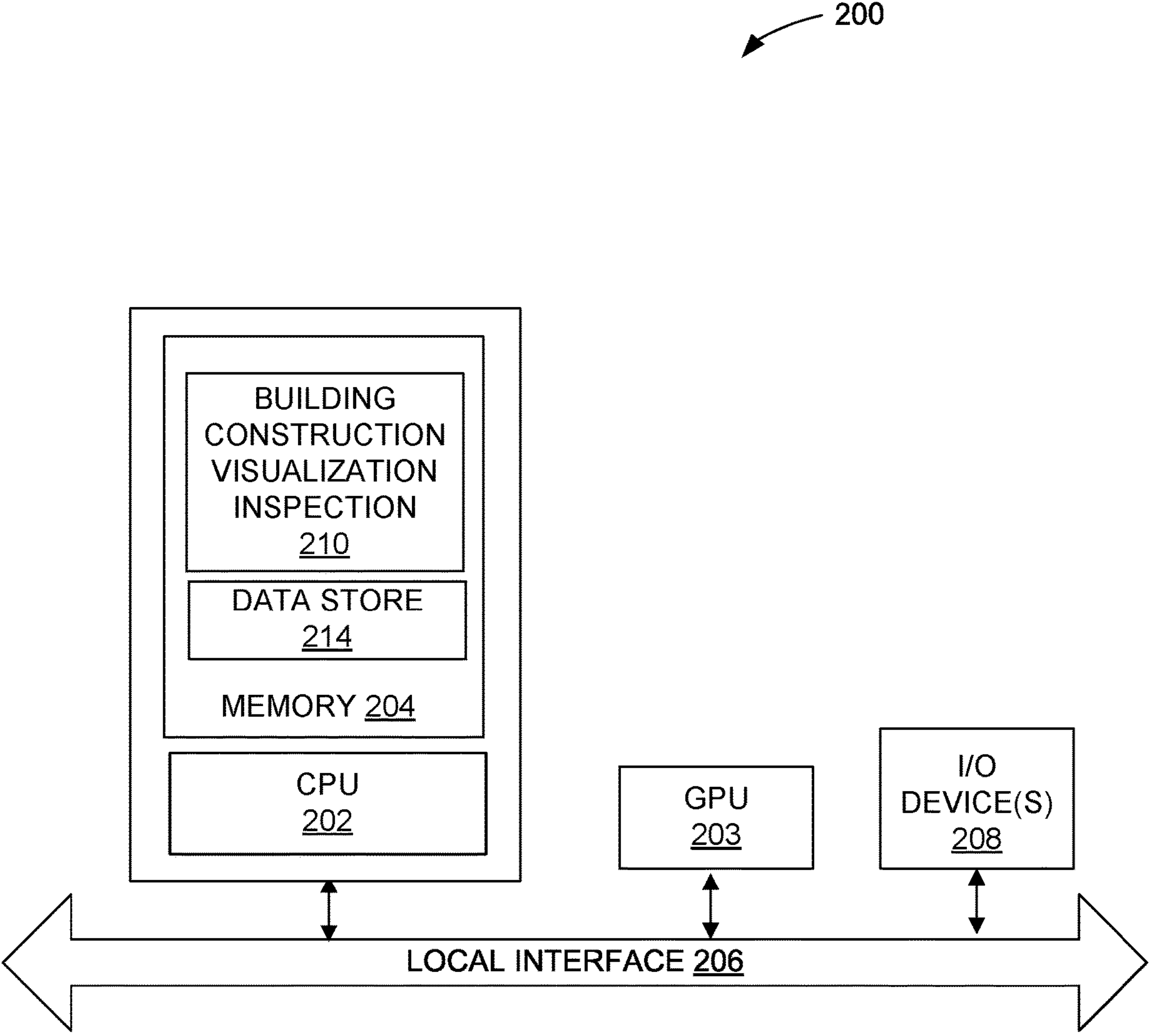
FIG. 2 shows a schematic block diagram of a computing device that can be used to implement various embodiments of the present disclosure.

FIG. 2 depicts a schematic block diagram of a computing device 200 (e.g., computing platform) that can be used to implement various embodiments of the present disclosure. An exemplary computing device 200 includes at least one processor circuit, for example, having one or more processors, such as a central processing unit (CPU) 202 and/or a graphical processing unit (GPU) 203, and a memory 204, both of which are coupled to a local interface 206, and one or more input and output (I/O) devices 208. The local interface 206 may comprise, for example, a data bus with an accompanying address/control bus or other bus structure as can be appreciated. The CPU and/or GPU(s) can perform various operations such as image enhancement, graphics rendering, image/video processing, recognition (e.g., text recognition, object recognition, feature recognition, etc.), image stabilization, machine learning, filtering, image classification, and any of the various operations described herein.

Stored in the memory 204 are both data and several components that are executable by the processor 202. In particular, stored in the memory 204 and executable by the processor 202 are code 210 for implementing building construction inspection visualization operations (e.g., executing an ML-based point cloud algorithm) as described herein. Also stored in the memory 204 may be a data store 214 and other data. The data store 214 can include a database for Building Information Model (BIM) data (e.g., as-built BIM model data, as-planned BIM model data, etc.), point cloud data (e.g., as-built point cloud data), and potentially other data (e.g., permit application file). In addition, an operating system may be stored in the memory 204 and executable by the processor 202. The I/O devices 208 may include input devices, for example but not limited to, a keyboard, mouse, communication adapters and/or transceivers, imaging device, scanner, camera etc. Furthermore, the I/O devices 608 may also include output devices, for example but not limited to, a printer, display or monitor, virtual reality headset, etc.

Figure 3:
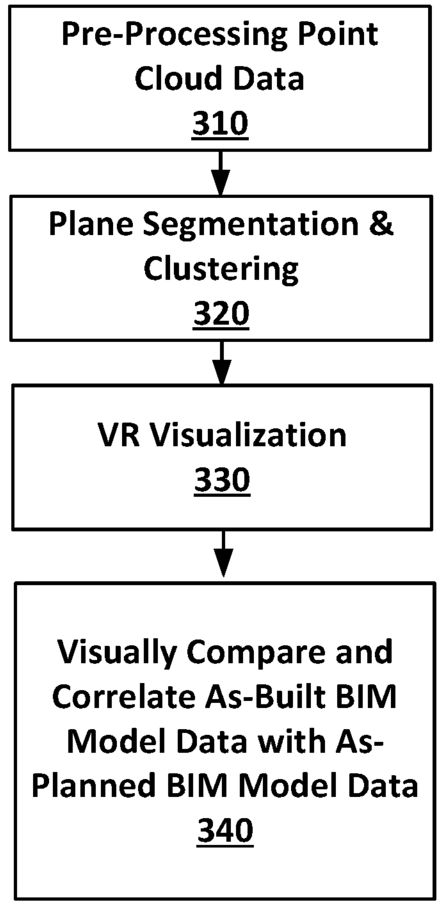
FIG. 3 is a flowchart diagram for an exemplary method for virtual building construction inspection in accordance with various embodiments of the present disclosure.

Referring now to FIG. 3, a flowchart diagram is provided for an exemplary method for virtual building construction inspection in accordance with various embodiments of the present disclosure. The method begins with pre-processing (310) point cloud data and performing (320) plane segmentation & clustering. In various embodiments, the point cloud data is collected, in which the collected data can comprise X, Y, Z coordinate points, point normal, and color data. However, this raw data does not provide any additional information regarding the type of material or what building part it corresponds to. Accordingly, machine learning (ML) based algorithms can be executed on the point cloud data to extract geometry data of individual building components that can then be integrated into BIM. For example, in various embodiments, a RANSAC algorithm is executed by a computing device 200 to identify building surfaces from the point cloud data based on specified rules, and a DBSCAN algorithm is executed to perform clustering of building components. In various embodiments, marching algorithm and triangulation processes are implemented to create mesh data for rendering in a virtual reality (VR) environment.

Accordingly, an as-built BIM model (330) is built from the mesh data and VR visualization is performed (340) in a streamlined single workflow process. In various embodiments, VR visualization is implemented using Unity 3D VR modeling engine and rendering pipelines are developed to visual point cloud and generated geometries.

With the as-built BIM model and its as-built 3D data generated from the point cloud data, an as-planned BIM model can be visually compared and correlated with the as-built BIM model, as shown in block 340 of FIG. 3. Correspondingly, in various embodiments, a VR visualization viewer graphical interface is rendered and acts an interactive platform for users to view and correlate the as-planned BIM model against as-built 3D data that is generated from the point cloud data (as described in blocks 310-320). In various embodiments, the as-planned BIM model data can be overlaid on as-built BIM model data within the VR visualization viewer.

Certain embodiments of the present disclosure can be implemented in hardware, software, firmware, or a combination thereof. If implemented in software, building construction inspection visualization logic or functionality are implemented in software or firmware that is stored in a memory and that is executed by a suitable instruction execution system. If implemented in hardware, building construction visualization inspection logic or functionality can be implemented with any or a combination of the following technologies, which are all well known in the art: discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In accordance with various embodiments, systems and methods of the present disclosure enable engineering and structural building inspections. Such systems/methods utilize structural rebar data capture from point cloud and image captures (LiDAR, digital photography, and Thermal Infra-Red or TIR images; also referred to as "Integrated TIR and LiDAR" in this document) for compliance; truss design, size, and comparisons with a building design. Non-intrusive sensor-based analysis of building structures can be performed, such as for the slab, foundation, and other building structures by captured data for compliance/comparison with engineering specifications.

In accordance with various embodiments, systems and methods of the present disclosure enable architectural building inspections. Such systems/methods can utilize integrated TIR and LiDAR-based point cloud data capture for windows, doors' location, staircase (rise, tread, width, numbers), balustrades for comparison with design specifications; room measurements, wall and ceiling heights per architectural drawings, etc. Further, such systems/methods can utilize integrated TIR and LiDAR-based point cloud data capture after framing by overlaying or superimposing data on a design model to determine the variance and/or utilize captured data for compliance in assessing roof decking thickness and other properties, fastener spacing data capture, etc.

In accordance with various embodiments, systems and methods of the present disclosure enable safety/hazard building inspections. Such systems/methods can utilize integrated TIR and LiDAR-based point cloud data capture to identify safety/hazard issues (OSHA compliance).

In accordance with various embodiments, systems and methods of the present disclosure enable data visualization and exchange. Such systems/methods can check for non-compliance issues by overlaying or superimposing captured data on a design model and visualizing in 2D or 3D via a computing device (e.g., VR headset, tablet device, etc.) by permit officials; support onsite permit official/developer/project manager visits (accessible via an exemplary computing device (e.g., VR headset, tablet, etc.)); support developer staff to compare bill of materials, wastage quantities, etc.; support the training of AEC professionals, etc.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

The invention claimed is:

1. A method comprising:

storing, by a computing device executing a single software workflow, an as-planned building information model (BIM) data for a building project, wherein the as-planned BIM data comprises a 3D design model of the building project;

acquiring, by the computing device executing the single software workflow, an as-built point cloud data of the building project;

processing, via machine learning by the computing device executing the single software workflow, the as-built point cloud data to generate cluster points;

generating, via machine learning by the computing device executing the single software workflow, 3D geometry and mesh data for each cluster point set that correspond to different building components;

converting, by the computing device executing the single software workflow, the 3D geometry and mesh data into as-built BIM data comprising an as-built 3D model, in a BIM file format, constructed from the different building components;

comparing, by the computing device executing the single software workflow, the as-built BIM data and the as-planned BIM data and determining a discrepancy between geometries of the as-built BIM data and the as-planned BIM data;

outputting, by the computing device executing the single software workflow, an inspection report identifying the discrepancy between geometries of the as-built point cloud data and the as-planned BIM data;

performing, by the computing device executing the single software workflow, virtual reality visualization of the as-built 3D model comprising the 3D geometries generated from the as-built point cloud data and correlating the 3D geometries with the as-planned BIM data and showing the discrepancy between the geometries of the as-built BIM data and the as-planned BIM data; and performing, by the computing device executing the single software workflow, compliance checking of the as-built 3D model by comparing the as-built 3D model against building rules and codes.

2. The method of claim 1, wherein the cluster points are generated using a density-based spatial clustering of applications with a noise (DBSCAN) algorithm performed by the computing device.

3. The method of claim 1, wherein the as-planned BIM data is imported from an Autodesk Revit file.

4. The method of claim 1, wherein the as-built point cloud data is acquired from an imaging device or camera using LiDAR technology.

5. The method of claim 1, wherein an as-planned 3D model is overlayed on top of the as-built 3D model of the building project, wherein the as-planned BIM data comprises the as-planned 3D model.

6. The method of claim 1, wherein the as-built point cloud data comprises thermal imaging data and/or LiDAR data and/or digital laser scanned and/or digital photographs of the building project.

7. A system comprising:

at least one processor; and memory configured to communicate with the at least one processor, wherein the memory stores instructions that, in response to execution by the at least one processor, cause the at least one processor to perform operations within a single software workflow comprising:

storing an as-planned building information model (BIM) data for a building project, wherein the as-planned BIM data comprises a 3D design model of the building project;

acquiring an as-built point cloud data of the building project;

processing, via machine learning, the as-built point cloud data to generate cluster points;

generating, via machine learning, a 3D geometry and mesh data for each cluster point that correspond to different building components;

converting the 3D geometry and mesh data into as-built BIM data comprising an as-built 3D model, in a BIM file format, constructed from the different building components;

comparing the as-built BIM data and the as-planned BIM data and determining a discrepancy between geometries of the as-built BIM data and the as-planned BIM data;

outputting an inspection report identifying the discrepancy between geometries of the as-built point cloud data and the as-planned BIM data;

performing virtual reality visualization of the as-built 3D model comprising the 3D geometries generated from the as-built point cloud data and correlating the 3D geometries with the as-planned BIM data; and performing compliance checking of the as-built 3D model with building rules and codes.

8. The system of claim 7, wherein the cluster points are generated using a density-based spatial clustering of applications with noise (DBSCAN) algorithm performed by the at least one processor.

9. The system of claim 7, wherein an as-planned 3D model is overlayed on top of the as-built 3D model of the building project, wherein the as-planned BIM data comprises the as-planned 3D model.

10. The system of claim 7, wherein the as-built point cloud data is acquired from an imaging device or camera using LiDAR technology.

11. The system of claim 7, wherein the as-built point cloud data comprises thermal imaging data and/or LiDAR data and/or digital laser scanned and/or digital photographs of the building project.

12. A non-transitory, tangible computer-readable storage medium having instructions stored thereon that, in response to execution by a computer-based system, cause the computer-based system to perform operations within a single software workflow comprising:

storing an as-planned building information model (BIM) data for a building project, wherein the as-planned BIM data comprises a 3D design model of the building project;

acquiring an as-built point cloud data of the building project;

processing, via machine learning, the as-built point cloud data to generate cluster points;

generating, via machine learning, a 3D geometry and mesh data for each cluster point that correspond to different building components;

converting the 3D geometry and mesh data into as-built BIM data comprising an as-built 3D model, in a BIM file format, constructed from the different building components;

comparing the as-built BIM data and the as-planned BIM data and determining a discrepancy between geometries of the as-built BIM data and the as-planned BIM data;

outputting an inspection report identifying the discrepancy between geometries of the as-built point cloud data and the as-planned BIM data;

performing virtual reality visualization of the as-built 3D model comprising the 3D geometries generated from the as-built point cloud data and correlating the 3D geometries with the as-planned BIM data; and performing compliance checking of the as-built 3D model with building rules and codes.

13. The non-transitory, tangible computer-readable storage medium of claim 12, wherein the cluster points are generated using a density-based spatial clustering of applications with noise (DBSCAN) algorithm performed by the computer-based system.

14. The non-transitory, tangible computer-readable storage medium of claim 12, wherein an as-planned 3D model is overlayed on top of the as-built 3D model of the building project, wherein the as-planned BIM data comprises the as-planned 3D model.

15. The non-transitory, tangible computer-readable storage medium of claim 12, wherein the as-built point cloud data comprises thermal imaging data and/or LiDAR data and/or digital laser scanned and/or digital photographs of the building project.

* * * * *